UNITED STATES PATENT OFFICE.

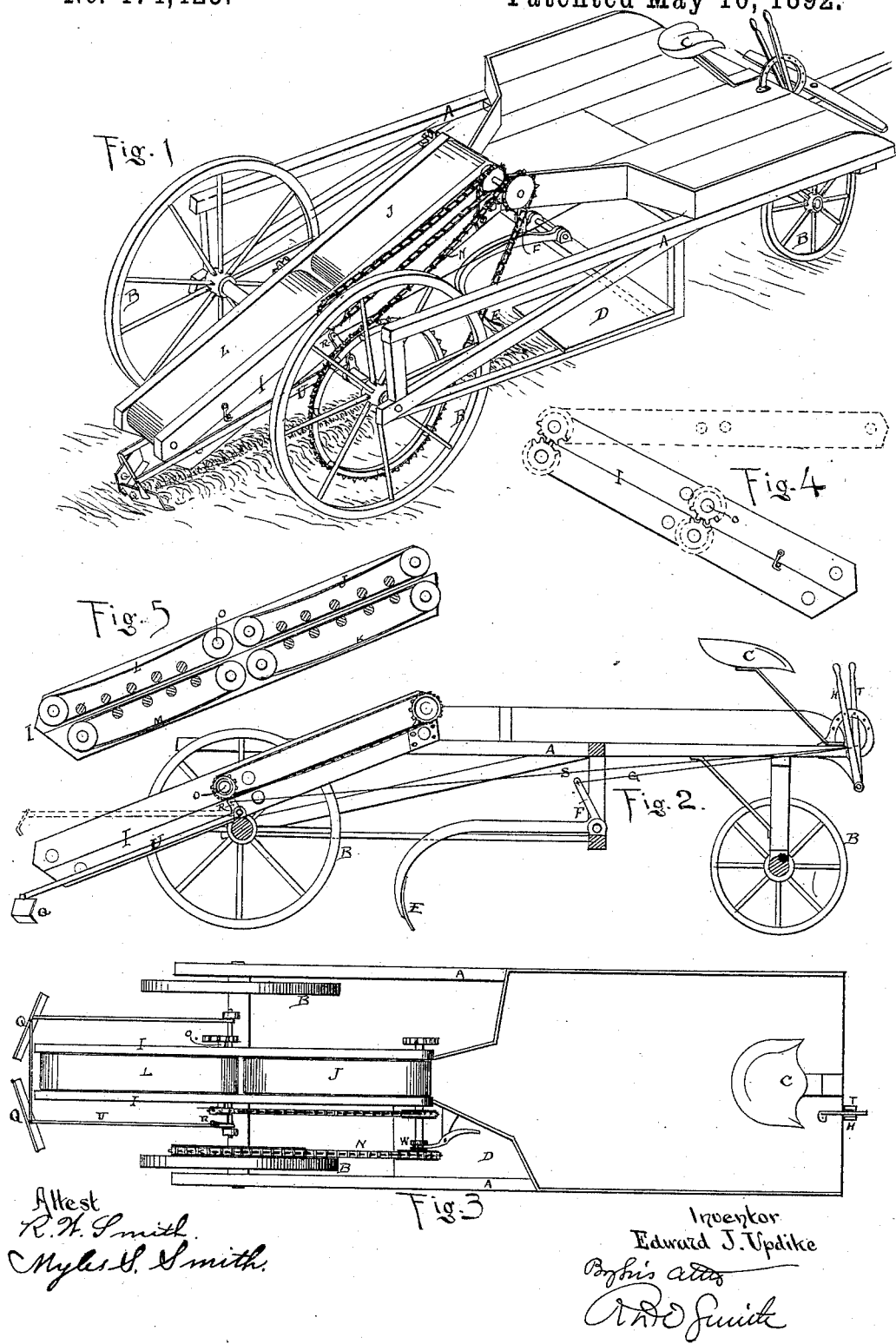

EDWARD J. UPDIKE, OF MISHAWAKA, INDIANA.

PLANTER.

SPECIFICATION forming part of Letters Patent No. 474,425, dated May 10, 1892.

Application filed March 16, 1891. Serial No. 385,247. (No model.)

*To all whom it may concern:*

Be it known that I, EDWARD J. UPDIKE, of Mishawaka, in the county of St. Joseph and State of Indiana, have invented a Machine for Transplanting Peppermint and for Like Purposes; and I do hereby declare that the following is a full and accurate description of the same, reference being had to the accompanying drawings, wherein—

Figure 1 is a perspective view of my machine. Fig. 2 is a side elevation of the same. Fig. 3 is a plan of the same. Fig. 4 is an elevation of the delivering apparatus. Fig. 5 is a longitudinal section of the feed device.

In the cultivation of peppermint it is found advisable to replant every third year, and this is done by transplanting the roots of a previous growth. These roots are obtained by plowing up the old plants, the plow being run through the center of the row and the old roots thereby split and thrown out of the ground. In replanting the furrow is opened by a shovel-plow, and the roots, which are matted together when they come from the ground, are as far as possible straightened and separated and laid in the furrow by hand. This occupation is very laborious; but so far as known no machine has heretofore been adapted to the proper handling and delivery of this material. Therefore, while for convenience I will show and describe my planter as I have constructed and used it, I do not design to limit myself to the details shown and described, because they may be greatly varied without in any way changing the principles or effectiveness of its operation.

A is a suitable frame mounted upon wheels B B and provided with a tongue and other requisites for the attachment of a team for propelling the machine over the field.

C is a seat for the driver, and D is a foot-board on which the attendant may stand to feed and supervise the action of the machine.

A furrow-opening shovel E is mounted in a suitable way beneath the frame A, the drag-bar being attached to some part of said frame A and being provided with suitable lever attachments wherewith the plow may be lifted out of its furrow at the will of the driver or other attendant whenever it may be desirable to do so. As an illustration I show the bell-crank lever F, the rod G, and the foot-lever H, the latter of which may be provided with a suitable latch to hold the lever H and keep the plow suspended.

A platform is placed over the top of the frame A to hold the material to be operated on.

At the rear of the frame A and supported at a suitable inclination there is a frame I, which extends from a point somewhat above the platform nearly to the ground at the rear of the machine. This frame I bears rollers for belts, which carry the material from the platform and deposit it upon the ground in the furrow. These belts are arranged in parallel pairs close together, so that the material is grasped between them and forced to move forward with the motion of said belts. I have employed them in two and more sets, the receiving-belts J K having imparted to them a less rapid movement than the delivering-belts L M, and the material is thereby to some extent drawn out and separated as it passes from one end of the feed apparatus to the other. The belts derive their motion from one or both of the rear wheels B, and for that purpose a belt N of some suitable description is employed to transmit motion from the wheel or its axle to one of the belt-rollers, and other belts or gearing may be employed to transmit said motion to the remaining rollers and the carrying-belts. I have employed chain belts as the most suitable, proper sprocket-wheels being attached to the driving-wheel and to the upper roller at the head of the frame I. From this roller another belt passes to the roller O of the second series, the sprocket or other transmitting wheels being different in diameter, so as to vary the speed, as heretofore specified. I prefer to transmit motion from the upper to the lower set of rollers by means of spur-gearing, as shown in Fig. 4.

For convenience of inspection and repair I make the frame I in two parts divided longitudinally and hinged upon the spindle of the first driven roller. The upper part of said frame may then be lifted up and the carrying or feed belts separated, as shown in Fig. 4. This separation may be accomplished in other ways, if preferred.

Covering-shovels Q may be attached to the rear of the frame A by rods U or in any suitable way and may be provided with bell-crank R, rod S, and lever T, to be managed in the same way and effect as the opening-shovel E. The belts may be supported along their opposing surfaces by a series of cross rods or rollers, as shown in Fig. 5, so as to confine the roots between them and prevent the belts from sagging apart.

W is a clutch by means of which the driving-belt N may be disconnected and the belt-rollers permitted to come to rest.

Having described my invention, I claim—

1. A machine for planting peppermint-roots and the like, consisting, essentially, of a frame supported upon wheels, and attached to the same a plow to open a furrow, a force-feed delivery apparatus consisting of parallel belts which receive said material and forcibly convey it to the furrow, substantially as set forth, and means for propelling said belts.

2. A machine for planting peppermint and the like, consisting, in the combination, with a suitable frame mounted upon wheels, of a plow for opening a furrow, a force-feed apparatus consisting of parallel belts, means for transmitting motion from the wheels to the rollers of said belts, and covering-scrapers, substantially as set forth.

3. In a machine for planting peppermint-roots and the like, a force-feed apparatus consisting of two or more sets of parallel belts having imparted to them progressively more rapid motion for the purpose of drawing out and separating said roots and delivering them upon the ground, substantially as set forth.

4. In a machine for planting peppermint-roots and the like, a frame supported upon wheels, a force-feed delivery apparatus consisting of two or more sets of parallel belts mounted in a frame, a belt connection with one of said wheels to propel one of said belt-rollers, and connections whereby the motion of said roller is transmitted to the remaining rollers of the system.

EDWARD J. UPDIKE.

Witnesses:
DEWITT C. UPDIKE,
R. D. O. SMITH,
MYLES S. SMITH.